United States Patent
Huang et al.

(10) Patent No.: US 10,135,525 B2
(45) Date of Patent: Nov. 20, 2018

(54) FIBER-CUT DETECTION METHOD, APPARATUS, AND SYSTEM FOR DISTRIBUTED RAMAN FIBER AMPLIFIER

(71) Applicant: HUAWEI TECHNOLOGIES CO., LTD., Shenzhen (CN)

(72) Inventors: Yansui Huang, Shenzhen (CN); Enbo Zhou, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/196,381

(22) Filed: Jun. 29, 2016

(65) Prior Publication Data

US 2016/0308609 A1    Oct. 20, 2016

Related U.S. Application Data

(63) Continuation of application No. PCT/CN2013/091161, filed on Dec. 31, 2013.

(51) Int. Cl.
*H04B 10/079* (2013.01)
*H04J 14/02* (2006.01)
(Continued)

(52) U.S. Cl.
CPC ..... *H04B 10/0791* (2013.01); *H04B 10/0771* (2013.01); *H04B 10/2916* (2013.01); *H04J 14/02* (2013.01)

(58) Field of Classification Search
CPC .............. H04B 10/0777; H04B 10/079; H04B 10/07955; H04B 10/0797; H04B 10/2916;
(Continued)

(56) References Cited

U.S. PATENT DOCUMENTS

| | | | | |
|---|---|---|---|---|
| 6,850,360 B1* | 2/2005 | Chen | ................. | H04B 10/2916 359/334 |
| 2003/0011874 A1* | 1/2003 | Nakamoto | ......... | H04B 10/0775 359/334 |

(Continued)

FOREIGN PATENT DOCUMENTS

| | | |
|---|---|---|
| CN | 1874193 A | 12/2006 |
| CN | 101217313 A | 7/2008 |

(Continued)

OTHER PUBLICATIONS

International Search Report dated Oct. 15, 2014, in corresponding International Application No. PCT/CN2013/091161.

(Continued)

*Primary Examiner* — David Payne
*Assistant Examiner* — Casey Kretzer
(74) *Attorney, Agent, or Firm* — Staas & Halsey LLP

(57) ABSTRACT

The present invention provides a fiber-cut detection method, apparatus, and system. When a fiber cut occurs, power of input signal light decreases quickly at a fiber-cut location. When the fiber-cut location is relatively far away from an amplifier, pump light consumption of the input signal light in the remaining fiber reduces due to reduction of the input signal light, which causes an increase of remaining pump optical power in the fiber and an increase of an actual gain value of the amplifier. A gain-locking function of the amplifier works, which decreases pump power of the pump light and maintains a gain of the amplifier unchanged basically. Output optical power of the amplifier decreases quickly with decrease of input optical power, and when power of an output optical signal decreases to power that is lower than preset power of the output optical signal, it is determined that a fiber cut occurs.

10 Claims, 7 Drawing Sheets

(51) Int. Cl.
*H04B 10/077* (2013.01)
*H04B 10/291* (2013.01)

(58) Field of Classification Search
CPC .............. H04B 10/2931; H04B 10/294; H04B 2210/078; H04B 2210/08; H04J 14/0221
See application file for complete search history.

(56) References Cited

U.S. PATENT DOCUMENTS

| | | | |
|---|---|---|---|
| 2003/0194233 A1 | 10/2003 | Casanova et al. | |
| 2004/0052524 A1* | 3/2004 | Arnold | H04J 14/0221 398/38 |
| 2006/0139742 A1* | 6/2006 | Frankel | H04J 14/0221 359/341.4 |
| 2006/0198016 A1 | 9/2006 | Akbaba et al. | |
| 2006/0251364 A1* | 11/2006 | Terahara | G02B 6/29377 385/100 |
| 2006/0274402 A1* | 12/2006 | Ghera | H01L 31/14 359/334 |
| 2007/0109626 A1 | 5/2007 | Zhou et al. | |
| 2008/0075459 A1 | 3/2008 | Wang et al. | |
| 2008/0158658 A1 | 7/2008 | Sugaya | |
| 2009/0169212 A1 | 7/2009 | Onaka et al. | |
| 2012/0177366 A1* | 7/2012 | Clouet | H04B 10/0777 398/30 |
| 2012/0327505 A1 | 12/2012 | Fu et al. | |

FOREIGN PATENT DOCUMENTS

| | | |
|---|---|---|
| CN | 101453266 A | 6/2009 |
| CN | 101552428 A | 10/2009 |
| CN | 102307068 A | 1/2012 |
| EP | 1 353 460 A1 | 10/2003 |
| EP | 1 508 985 A1 | 2/2005 |
| EP | 2 639 898 A1 | 9/2013 |

OTHER PUBLICATIONS

International Search Report and Written Opinion dated Oct. 15, 2014 in corresponding International Patent Application No. PCT/CN2013/091161.

Extended European Search Report dated Oct. 31, 2016 in corresponding European Patent Application No. 13900749.6.

Chinese Office Action dated Sep. 2, 2016 in corresponding Chinese Patent Application No. 201380002432.X.

Chang, "Research on Distributed Optical Fiber Sensing System Based on Brillouin Scattering", Ph.D. Dissertation, School of Control Science and Engineering, Shandong University, Apr. 2009, pp. 1-143.

Kuo et al., "Probe-Trace Distortion of 1.65 μm Optical Time-Domain Reflectometry in On-Line Monitoring 1.55 μm Fiber Raman Amplifier Transmission System", Japanese Journal of Applied Physics, vol. 43, Part 1, No. 1, The Japan Society of Applied Physics, Jan. 13, 2004, pp. 1-2.

\* cited by examiner

FIBER-CUT DETECTION METHOD, APPARATUS, AND SYSTEM FOR DISTRIBUTED RAMAN FIBER AMPLIFIER

CROSS-REFERENCE TO RELATED APPLICATIONS

This application is a continuation of International Application No. PCT/CN2013/091161, filed Dec. 31, 2013, which is hereby incorporated by reference in its entirety.

TECHNICAL FIELD

The present invention relates to the field of communications technologies, and in particular, to a fiber-cut detection method, apparatus, and system for a distributed Raman fiber amplifier.

BACKGROUND

With development of optical fiber communication technologies, in a communications link, a distributed Raman (Raman) fiber amplifier gradually replaces a conventional discrete erbium-doped fiber amplifier by virtue of such features as small crosstalk, low noise, wide spectrum ranges, and high gains. The distributed Raman fiber amplifier injects high-power pump light into an optical fiber in a communications link, and amplifies an optical signal in the optical fiber by utilizing a stimulated Raman scattering effect, thereby implementing long-distance transmission of the optical signal. Power of pump light injected by the distributed Raman amplifier is excessively high, if a fiber cut occurs, pump light leaking out from a fiber-cut location easily causes injury to the human body. Therefore, it is required to detect the fiber cut quickly, and turn off a pump laser of the amplifier or decrease power of the pump light to a safe level in a timely manner, so as to ensure safe operating of a communications system.

In a communications link using a conventional discrete erbium-doped fiber amplifier, output power of signal light transmitted over an optical fiber needs to be detected only at an input end of the amplifier, and when the output power of the signal light is less than a preset threshold, it indicates that signal light leakage occurs during transmission, and then it can be determined that a fiber cut occurs on the optical fiber.

However, in a communications link using a backward pump distributed Raman amplifier (a direction of pump light is opposite to a direction of signal light), the distributed Raman amplifier injects the pump light backwards into an upstream communications optical fiber, and amplifies signal light in the upstream communications optical fiber by utilizing the Raman scattering effect, where the communications optical fiber itself is used as a gain medium. When a fiber cut occurs on the upstream communications optical fiber, the signal light leaks out. However, the pump light in the communications optical fiber generates spontaneous emission light in the fiber, where a waveband of the spontaneous emission light includes a signal optical waveband. The spontaneous emission light is amplified continuously, which results in that a high-power optical signal at the signal optical waveband may still be detected at an input end of the amplifier (an output end of the upstream communications optical fiber). Therefore, a method for detecting signal optical power at an input end or an output end of an amplifier is not suitable for fiber-cut detection.

SUMMARY

In view of this, embodiments of the present invention provide a fiber-cut detection method, apparatus, and system for a distributed Raman fiber amplifier, where a gain-locking function is used to control an actual gain value to be equal to a preset gain value, so as to ensure that when a fiber cut occurs, power of an output optical signal is much lower than minimum output power of an amplifier in normal link operation, thereby implementing accurate determining of the fiber cut.

A first aspect of the embodiments of the present invention provides a fiber-cut detection method for a distributed Raman fiber amplifier, where the method is applied to a monitor having a gain-locking function and includes:

monitoring a power value of a supervisory optical signal and a power value of an output optical signal, where the supervisory optical signal is an optical signal at a long-wave end outside traffic optical signal bandwidth and/or an optical signal at a short-wave end outside traffic optical signal bandwidth that are/is obtained by filtering an input optical signal;

calculating an actual gain value of an amplifier according to the power value of the supervisory optical signal;

comparing the actual gain value of the amplifier with a preset gain value of the amplifier, and controlling the actual gain value of the amplifier and the preset gain value of the amplifier to be equal by using the gain-locking function; and determining whether the power value of the output optical signal is less than a preset power value of the output optical signal, and if yes, determining that a fiber cut occurs.

In a first possible implementation manner of the first aspect of the embodiments of the present invention, the method further includes:

when it is determined that a fiber cut occurs, sending, to a pump source, a turn-off control signal to control turn-off of the pump source or decrease pump power to a safe range.

In a second possible implementation manner of the first aspect of the embodiments of the present invention, the method further includes:

monitoring a power value of pump light output by a pump source; where the calculating an actual gain value of an amplifier according to the power value of the supervisory optical signal is:

calculating the actual gain value of the amplifier according to the power value of the supervisory optical signal and the power value of the pump light.

In a third possible implementation manner of the first aspect of the embodiments of the present invention, the calculating an actual gain value of an amplifier according to the power value of the supervisory optical signal is:

calculating the actual gain value of the amplifier according to the power value of the supervisory optical signal and the power value of the output optical signal.

In a fourth possible implementation manner of the first aspect of the embodiments of the present invention, the calculating an actual gain value of an amplifier according to the power value of the supervisory optical signal is:

calculating the actual gain value of the amplifier according to the power value of the supervisory optical signal, a power value of pump light, and the power value of the output optical signal.

With reference to the first aspect to the fourth possible implementation manner of the first aspect of the embodiments of the present invention, in a fifth possible implementation manner, the comparing the actual gain value of the amplifier with a preset gain value of the amplifier, and controlling the actual gain value of the amplifier and the preset gain value of the amplifier to be equal by using the gain-locking function includes:

when the actual gain value of the amplifier is greater than the preset gain value of the amplifier, sending, to the pump source, an attenuation control signal to control the pump source to decrease the power of the pump light; or when the actual gain value of the amplifier is less than the preset gain value of the amplifier, sending, to the pump source, an amplification control signal to control the pump source to increase the power of the pump light.

A second aspect of the embodiments of the present invention provides a fiber-cut detection apparatus for a distributed Raman fiber amplifier, where the apparatus includes:

a first monitoring module, configured to monitor a power value of a supervisory optical signal and a power value of an output optical signal, where the supervisory optical signal is an optical signal at a long-wave end outside traffic optical signal bandwidth and/or an optical signal at a short-wave end outside traffic optical signal bandwidth that are/is obtained by filtering an input optical signal;

a calculation module, configured to calculate an actual gain value of an amplifier according to the power value of the supervisory optical signal;

a first control module, configured to: compare the actual gain value of the amplifier with a preset gain value of the amplifier, and control the actual gain value of the amplifier and the preset gain value of the amplifier to be equal by using a gain-locking function; and a detection module, configured to determine whether the power value of the output optical signal is less than a preset power value of the output optical signal, and if yes, determine that a fiber cut occurs.

In a first possible implementation manner of the second aspect of the embodiments of the present invention, the apparatus further includes:

a second control module, configured to: when it is determined that a fiber cut occurs, send, to a pump source, a turn-off control signal to control turn-off of the pump source or decrease pump power to a safe range.

In a second possible implementation manner of the second aspect of the embodiments of the present invention, the apparatus further includes:

a second monitoring module, configured to monitor a power value of pump light output by a pump source; where the calculation module is:

a first calculation unit, configured to calculate the actual gain value of the amplifier according to the power value of the supervisory optical signal and the power value of the pump light.

In a third possible implementation manner of the second aspect of the embodiments of the present invention, the calculation module is:

a second calculation unit, configured to calculate the actual gain value of the amplifier according to the power value of the supervisory optical signal and the power value of the output optical signal.

In a fourth possible implementation manner of the second aspect of the embodiments of the present invention, the calculation module is:

a third calculation unit, configured to calculate the actual gain value of the amplifier according to the power value of the supervisory optical signal, a power value of pump light, and the power value of the output optical signal.

With reference to the second aspect to the fourth possible implementation manner of the second aspect of the embodiments of the present invention, in a fifth possible implementation manner, the first control module includes:

a first control unit, configured to: when the actual gain value of the amplifier is greater than the preset gain value of the amplifier, send, to the pump source, an attenuation control signal to control the pump source to decrease the power of the pump light; and a second control unit, configured to: when the actual gain value of the amplifier is less than the preset gain value of the amplifier, send, to the pump source, an amplification control signal to control the pump source to increase the power of the pump light.

A third aspect of the embodiments of the present invention provides a fiber-cut detection system for a distributed Raman fiber amplifier, where the system includes:

a wavelength division multiplexer, a splitter apparatus, a pump source, and a monitor, where the wavelength division multiplexer receives at least one channel of pump light output by the pump source, and injects the received pump light backwards into a communications optical fiber; and the wavelength division multiplexer further receives an input optical signal and transmits the input optical signal to the splitter apparatus;

the splitter apparatus obtains a supervisory optical signal by filtering the input optical signal, and uses a first preset proportion of light, split from an output optical signal, as an output detection optical signal, where the supervisory optical signal is an optical signal at a long-wave end outside traffic optical signal bandwidth and/or an optical signal at a short-wave end outside traffic optical signal bandwidth that are/is obtained by filtering the input optical signal; and the monitor monitors a power value of the supervisory optical signal, monitors a power value of the output optical signal by using the output detection optical signal, and calculates an actual gain value of an amplifier according to the power value of the supervisory optical signal; the monitor compares the actual gain value of the amplifier with a preset gain value of the amplifier, and controls the actual gain value of the amplifier and the preset gain value of the amplifier to be equal by using a gain-locking function; and the monitor determines whether the power value of the output optical signal is less than a preset power value of the output optical signal, and if yes, determines that a fiber cut occurs.

In a first possible implementation manner of the third aspect of the embodiments of the present invention, the splitter apparatus includes:

one wavelength division multiplexer and one optical signal splitter connected in sequence, where the wavelength division multiplexer obtains, by filtering the input optical signal, the optical signal at the long-wave end outside traffic optical signal bandwidth or the optical signal at the short-wave end outside traffic optical signal bandwidth; and the optical signal splitter uses the first preset proportion of light, split from the output optical signal, as the output detection optical signal.

In a second possible implementation manner of the third aspect of the embodiments of the present invention, the splitter apparatus includes:

two optical signal splitters and one filter, where one optical signal splitter uses a second preset proportion of light, split from the output optical signal, as a filtering optical signal, and the filter filters the filtering optical signal to obtain the optical signal at the long-wave end outside traffic optical signal bandwidth or the optical signal at the short-wave end outside traffic optical signal bandwidth; and the other optical signal splitter uses the first preset proportion of light, split from the output optical signal, as the output detection optical signal.

In a third possible implementation manner of the third aspect of the embodiments of the present invention, the splitter apparatus includes:

two wavelength division multiplexers and one optical signal splitter connected in sequence, where the two wavelength division multiplexers respectively obtain, by filtering the output optical signal, the optical signal at the long-wave end outside traffic optical signal bandwidth and the optical signal at the short-wave end outside traffic optical signal bandwidth; and the optical signal splitter uses the first preset proportion of light, split from the output optical signal, as the output detection optical signal.

In a fourth possible implementation manner of the third aspect of the embodiments of the present invention, the splitter apparatus includes:

three optical signal splitters and two filters, where a first optical signal splitter uses a second preset proportion of light, split from the output optical signal, as a first filtering optical signal, and a first filter filters the first filtering optical signal to obtain the optical signal at the long-wave end outside traffic optical signal bandwidth;

a second optical signal splitter uses a third preset proportion of light, split from the output optical signal, as a second filtering optical signal, and a second filter filters the second filtering optical signal to obtain the optical signal at the short-wave end outside traffic optical signal bandwidth; and a third optical signal splitter uses the first preset proportion of light, split from the output optical signal, as the output detection optical signal.

With reference to the third aspect to the fourth possible implementation manner of the third aspect of the embodiments of the present invention, in a fifth possible implementation manner, the system further includes:

a pump light splitting apparatus, where the pump light splitting apparatus includes at least one optical signal splitter, and a quantity of the optical signal splitters is the same as a quantity of optical pumps in the pump source;

each optical signal splitter in the pump light splitting apparatus uses a fourth preset proportion of light, split from pump light that is output by one optical pump in a pump source connected to the optical signal splitter, as a pump detection optical signal, and transmits the pump detection optical signal to the monitor; and the monitor monitors, according to the pump detection optical signal sent by each optical signal splitter in the pump light splitting apparatus, a power value of the pump light of the optical pump that is connected to the optical signal splitter, and calculates the actual gain value of the amplifier according to the power value of the supervisory optical signal and the power value of the pump light.

With reference to the third aspect to the fifth possible implementation manner of the third aspect of the embodiments of the present invention, in a sixth possible implementation manner, the monitor is further configured to calculate the actual gain value of the amplifier according to the power value of the supervisory optical signal and the power value of the output optical signal.

With reference to the third aspect to the fifth possible implementation manner of the third aspect of the embodiments of the present invention, in a seventh possible implementation manner, the monitor is further configured to calculate the actual gain value of the amplifier according to the power value of the supervisory optical signal, the power value of the pump light, and the power value of the output optical signal.

It can be learned from the foregoing content that, the present invention has the following beneficial effects:

The embodiments of the present invention provide a fiber-cut detection method, apparatus, and system for a distributed Raman fiber amplifier. When a fiber cut occurs, power of input signal light decreases quickly at a fiber-cut location. If the fiber-cut location is relatively far away from an amplifier, pump light consumption of input signal light in the remaining fiber reduces due to reduction of the input signal light, which causes an increase of remaining pump optical power in the fiber and an increase of an actual gain of the amplifier. A gain-locking function of the amplifier or a gain locking apparatus works quickly, which decreases pump power of pump light and maintains a gain of the amplifier unchanged basically. Because the gain of the amplifier is unchanged, output power of output signal light at an output end of the amplifier decreases quickly with the decrease, caused by the fiber cut, of the power of the input signal light. When the power of the output signal light decreases to power that is lower than preset power (less than or equal to minimum output power of the amplifier in normal working), it is determined that a fiber link failure occurs. If the fiber-cut location is relatively near an optical pump, an input optical signal cannot be amplified effectively by means of pump light due to a close distance between the fiber-cut location and the optical pump, power of an output optical signal decreases quickly due to the fiber cut, and when the power of the output optical signal is less than preset power, it is determined that a fiber link failure occurs. After it is determined that a fiber link failure occurs, a security protection program is started to turn off the pump light or decrease the pump optical power to a safe range. According to the embodiments of the present invention, the gain-locking function is used to prevent impact of an optical signal that is generated by the pump light due to spontaneous emission in the fiber, so that when a fiber cut occurs, output optical power of the amplifier is much lower than output optical power of the amplifier in normal working, thereby implementing link failure detection.

If a gain-locking function is unavailable, although power of an input optical signal decreases quickly in the case of a fiber cut, because pump optical power is unchanged, spontaneous emission light generated by pump light in a fiber includes light at a waveband of an input optical signal, and the spontaneous emission light that is generated by the pump light due to spontaneous emission and that is at the waveband of the input optical signal is amplified continuously, relatively high power of an output optical signal may still be detected at an output end of the fiber, where the optical power is close to or even higher than minimum output power of an amplifier in normal working. If a gain-locking function is available, with decrease of power of an input optical signal, a gain control apparatus controls pump optical power to decrease continuously. Accordingly, power of spontaneous emission light generated by pump light decreases continuously, and optical power of the spontaneous emission light at a waveband of the input optical signal also decreases continuously, which reduces impact brought by an optical signal that is generated due to spontaneous emission by the pump light in a fiber, so that when a fiber cut occurs, power of an output optical signal is much lower than minimum output power of an amplifier in normal working, thereby implementing link failure determining.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Embodiments of the present invention provide a fiber-cut detection method, apparatus, and system for a distributed Raman fiber amplifier, where a gain-locking function is used to control an actual gain value to be equal to a preset gain value, so as to ensure that when a fiber cut occurs, power of an output optical signal decreases quickly, which reduces impact of an optical signal generated by pump light in a fiber due to spontaneous emission, and implements quick fiber-cut detection.

The following describes the embodiments of the present invention in detail with reference to accompanying drawings.

Embodiment 1

Figure 1:
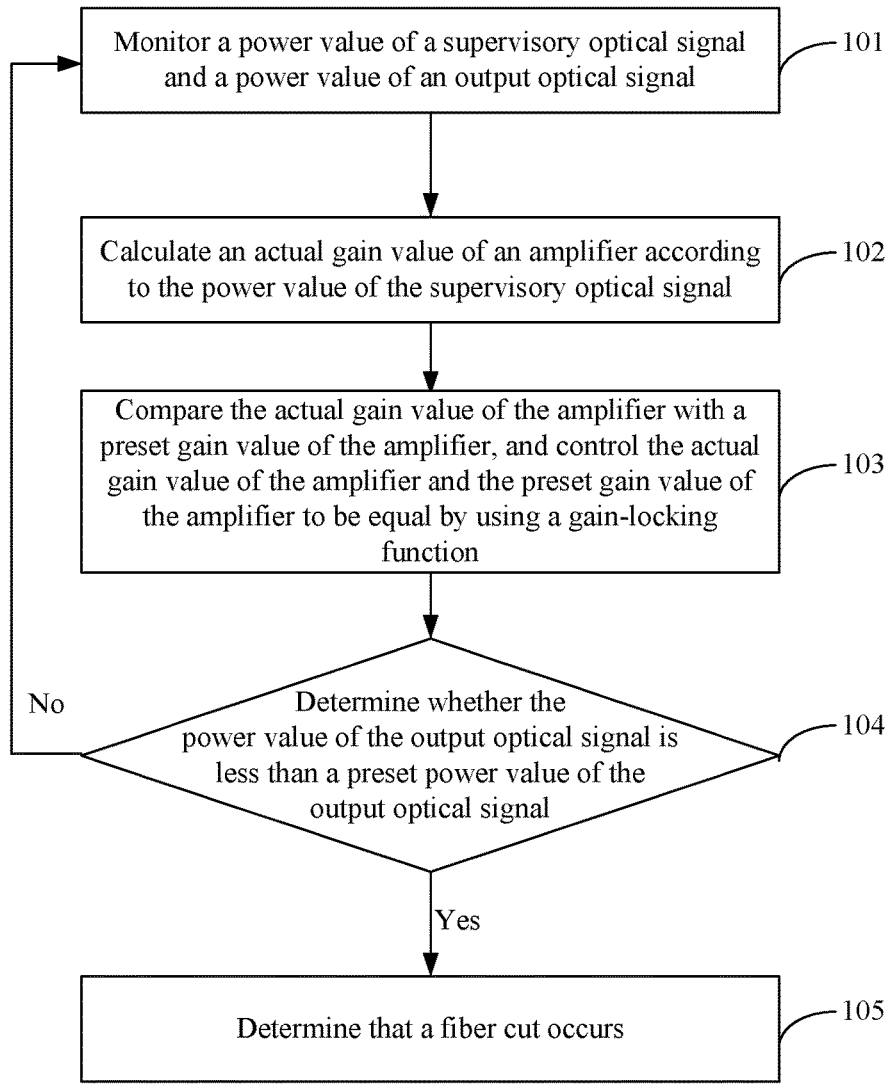
FIG. 1 is a flowchart of Embodiment 1 of a fiber-cut detection method for a distributed Raman fiber amplifier according to the present invention.

FIG. 1 is a flowchart of Embodiment 1 of a fiber-cut detection method for a distributed Raman fiber amplifier according to the present invention, where the method includes the following steps:

Step 101: Monitor a power value of a supervisory optical signal and a power value of an output optical signal.

The supervisory optical signal is an optical signal at a long-wave end outside traffic optical signal bandwidth and/or an optical signal at a short-wave end outside traffic optical signal bandwidth that are/is obtained by filtering an input optical signal.

In a communications system, a waveband of traffic signal light may generally be between 1529 nm and 1561 nm. An optical signal at a wavelength less than 1529 nm by tens of to a hundred nanometers is used as an optical signal at a short-wave end outside traffic optical signal bandwidth. For example, an optical signal at a wavelength between 1521 nm and 1523 nm is used as the optical signal at the short-wave end outside traffic optical signal bandwidth. An optical signal at a wavelength greater than 1561 nm by tens to hundreds of nanometers is used as an optical signal at a long-wave end outside traffic optical signal bandwidth. For example, an optical signal at a wavelength between 1570 nm and 1580 nm is used as the optical signal at the long-wave end outside traffic optical signal bandwidth. In general cases, when the optical signal at the short-wave end outside traffic optical signal bandwidth and the optical signal at the long-wave end outside traffic optical signal bandwidth are set, their bandwidth cannot be too close to traffic optical signal bandwidth, otherwise interference may be brought to a traffic optical signal; their bandwidth also cannot be too far away from traffic optical signal bandwidth, otherwise power of the supervisory optical signal is excessively low. Therefore, an optical signal within an appropriate wavelength range is selected as the supervisory optical signal according to an actual application situation.

A wavelength of the traffic signal light may also be between 1300 nm and 1320 nm, where an optical signal at a wavelength less than 1300 nm by tens to hundreds of nanometers is used as an optical signal at a short-wave end outside traffic optical signal bandwidth, and an optical signal at a wavelength greater than 1320 nm by tens to hundreds of nanometers is used as an optical signal at a long-wave end outside traffic optical signal bandwidth. A wavelength of the traffic signal light may also be between 1525 nm and 1565 nm, where an optical signal at a wavelength less than 1525 nm by tens to hundreds of nanometers is used as an optical signal at a short-wave end outside traffic optical signal bandwidth, and an optical signal at a wavelength greater than 1565 nm by tens to hundreds of nanometers is used as an optical signal at a long-wave end outside traffic optical signal bandwidth. A wavelength of the traffic signal light may also be between 1570 nm and 1610 nm, where an optical signal at a wavelength less than 1570 nm by tens to hundreds of nanometers is used as an optical signal at a short-wave end outside traffic optical signal bandwidth, and an optical signal at a wavelength greater than 1610 nm by tens to hundreds of nanometers is used as an optical signal at a long-wave end outside traffic optical signal bandwidth.

The power value of the supervisory optical signal and the power value of the output optical signal may be monitored in multiple manners, and two possible implementation manners are provided herein.

A first possible implementation manner is:

directly monitoring the power value of the supervisory optical signal and the power value of the output optical signal, where a supervisory optical signal obtained by filtering the output optical signal is received, the power value of the supervisory optical signal is directly measured, and the power value of the output optical signal is directly measured.

A second possible implementation manner is:

indirectly monitoring the power value of the supervisory optical signal and the power value of the output optical signal, where a preset proportion of optical signals is obtained by splitting the output optical signal, a preset proportion of supervisory optical signals is obtained by filtering the preset proportion of optical signals, and the preset proportion of supervisory optical signals is measured to obtain the power value of the supervisory optical signal indirectly; and another preset proportion of optical signals is obtained by splitting the output optical signal, and power of the another preset proportion of optical signals is measured to obtain the power value of the output optical signal indirectly.

It should be noted that monitoring of the power of the supervisory optical signal and the power of the output optical signal is not limited to the foregoing two implementation manners, and other monitoring methods may be used, which are not described one by one herein.

Step 102: Calculate an actual gain value of an amplifier according to the power value of the supervisory optical signal.

The supervisory optical signal is an optical signal at a long-wave end outside traffic optical signal bandwidth and/or an optical signal at a short-wave end outside traffic optical signal bandwidth that are/is obtained by filtering an input optical signal. The optical signal at the long-wave end outside traffic optical signal bandwidth and/or the optical signal at the short-wave end outside traffic optical signal bandwidth may be an ASE (Amplified spontaneous emission) optical signal at an edge of the traffic optical signal, or may be a marked optical signal that is added outside traffic optical signal bandwidth.

Power of the ASE is excessively low at an input end of an optical signal, which may be ignored. After ASE light is amplified by pump light, ASE in the output optical signal has an approximate linear relationship with gains of the amplifier, and the actual gain value of the amplifier can be calculated according to a power value of the ASE in the output optical signal. In an actual application, either or both of a power value $ASE_1$ of the optical signal at the short-wave end outside traffic optical signal bandwidth and a power value $ASE_2$ of the optical signal at the long-wave end outside traffic optical signal bandwidth may be used to calculate the actual gain value of the amplifier, and an actual gain value calculated by using the two optical signal power values $ASE_1$ and $ASE_2$ is more accurate than an actual gain value calculated by using either of the optical signal power values.

Formula (1) and formula (2) are calculation methods for calculating the actual gain value of the amplifier by using either of $ASE_1$ of the optical signal at the short-wave end outside traffic optical signal bandwidth and $ASE_2$ of the optical signal at the long-wave end outside traffic optical signal bandwidth:

$$Gain_1 = A_1 \times ASE_1 + F_1 \quad (1)$$

$$Gain_2 = A_2 \times ASE_2 + F_2 \quad (2)$$

where $Gain_1$ is an actual gain value of an optical signal in a traffic optical signal at a short-wave end, $ASE_1$ is a power value of the optical signal at the short-wave end outside traffic optical signal bandwidth, and $A_1$ and $F_1$ are system parameters for the short-wave end outside optical signal bandwidth; $Gain_2$ is an actual gain value of an optical signal in a traffic optical signal at a long-wave end, $ASE_2$ is a power value of the optical signal at the long-wave end outside traffic optical signal bandwidth, and $A_2$ and $F_2$ are system parameters for the short-wave end outside optical signal bandwidth.

The system parameters $A_1$, $A_2$, $F_1$, and $F_2$ of the amplifier are determined by using the following method:

(1) controlling pump power of the amplifier, and when a gain of the amplifier is $Gain_{ij}$ (i=1, 2; j=1, 2 . . . ), obtaining and recording power $ASE_{1j}$ and $ASE_{2j}$ of a supervisory channel;

(2) repeating step (1) (j increases by 1 each time) to obtain sufficient $Gain_{ij}$ (i=1, 2; j=1, 2, . . . ) and corresponding supervisory channel power $ASE_{1j}$ and $ASE_{2j}$ until $Gain_{ij}$ includes all or most gain values of the amplifier in a normally working state; and (3) using formulas:

$$Gain_{1j} = A_{1j} \times ASE_{1j} + F_{1j}$$

$$Gain_{2j} = A_{2j} \times ASE_{2j} + F_{2j}$$

to perform fitting on the foregoing $Gain_{ij}$ data that is obtained when j increases by 1 each time, to obtain coefficients $A_1$, $A_2$, $F_1$, and $F_2$, where a least square method or another known mathematical method may be used as the fitting method.

Fitting on the data obtained by using the foregoing steps is performed to obtain coefficients $A_i$ and $F_i$ (i=1, 2, . . . ), where the least square method or another known mathematical method may be used as the fitting method.

Formula (3) and formula (4) are calculation methods for calculating the actual gain values of the amplifier by using ASE1 of the optical signal at the short-wave end outside traffic optical signal bandwidth and ASE2 of the optical signal at the long-wave end outside traffic optical signal bandwidth:

$$Gain_1 = A_1 \times ASE_1 + B_1 \times ASE_2 + F_1 \quad (3)$$

$$Gain_2 = A_2 \times ASE_1 + B_2 \times ASE_2 + F_2 \quad (4)$$

where $Gain_1$ is an actual gain value of an optical signal in a traffic optical signal at a short-wave end, $ASE_1$ is a power value of the optical signal at the short-wave end outside traffic optical signal bandwidth, and $A_1$, $B_1$, and $F_1$ are system parameters for the short-wave end outside optical signal bandwidth; $Gain_2$ is an actual gain value of an optical signal in a traffic optical signal at a long-wave end, $ASE_2$ is a power value of the optical signal at the long-wave end outside traffic optical signal bandwidth, and $A_2$, $B_2$, and $F_2$ are system parameters for the short-wave end outside optical signal bandwidth.

The system parameters $A_1$, $A_2$, $B_1$, $B_2$, $F_1$, and $F_2$ of the amplifier are determined by using the following method:

(1) controlling pump power of the amplifier, and when a gain of the amplifier is $Gain_{ij}$ (i=1, 2; j=1, 2 . . . ), obtaining and recording power $ASE_{1j}$ and $ASE_{2j}$ of a supervisory channel;

(2) repeating step (1) (j increases by 1 each time) to obtain sufficient $Gain_{ij}$ (i=1, 2; j=1, 2, . . . ) and corresponding supervisory channel power $ASE_{1j}$ and $ASE_{2j}$, until $Gain_{ij}$ includes all or most gain values of the amplifier in a normally working state; and (3) using formulas:

$$Gain_{1j} = A_{1j} \times ASE_{1j} + B_{1j} \times ASE_{1j} + F_{1j}$$

$$Gain_2 = A_{2j} \times ASE_{2j} + B_{2j} \times ASE_{2j} + F_{2j}$$

to perform fitting on $Gain_{ij}$ data that is obtained when j increases by 1 each time and by using the foregoing steps to obtain coefficients $A_1$, $A_2$, $B_1$, $B_2$, $F_1$, and $F_2$, where a least square method or another known mathematical method may be used as the fitting method.

For a marked optical signal that is added outside traffic optical signal bandwidth, if a power value of the marked optical signal at an input end of a traffic optical signal is known, monitoring a power value of the marked optical signal in the output optical signal may obtain the actual gain value of the amplifier by means of calculation.

When the actual gain value of the amplifier is calculated, the actual gain value may be calculated according to the power value of the supervisory optical signal and the power value of the output optical signal by using formula (5) and formula (6), so as to obtain a more accurate actual gain value. Using the power of the output optical signal as one of parameters for calculating the actual gain value may increase precision of the actual gain value.

$$Gain_1 = A_1 \times ASE_1 + B_1 \times ASE_2 + C_1 \times OUT + F_1 \quad (5)$$

$$Gain_2 = A_2 \times ASE_1 + B_2 \times ASE_2 + C_2 \times OUT + F_2 \quad (6)$$

where $Gain_1$ is an actual gain value of an optical signal in a traffic optical signal at a short-wave end, $ASE_1$ is a power value of the optical signal at the short-wave end outside traffic optical signal bandwidth, OUT is the power value of the output optical signal, and $A_1$, $B_1$, $C_1$, and $F_1$ are system parameters for the short-wave end outside optical signal bandwidth; $Gain_2$ is an actual gain value of an optical signal in a traffic optical signal at a long-wave end, $ASE_2$ is a power value of the optical signal at the long-wave end outside traffic optical signal bandwidth, and $A_2$, $B_2$, $C_2$, and $F_2$ are system parameters for the short-wave end outside optical signal bandwidth.

The system parameters $A_1$, $A_2$, $B_1$, $B_2$, $C_1$, $C_2$, $F_1$, and $F_2$ of the amplifier are determined by using the following methods:

(1) controlling pump power of the amplifier, and when a gain of the amplifier is $Gain_{ij}$ (i=1, 2; j=1, 2 . . . ), obtaining and recording power $ASE_{1j}$ and $ASE_{2j}$ of a supervisory channel;

(2) repeating step (1) (j increases by 1 each time) to obtain sufficient $Gain_{ij}$ (i=1, 2; j=1, 2, . . . ) and corresponding supervisory channel power $ASE_{1j}$ and $ASE_{2j}$, until $Gain_{ij}$ includes all or most gain values of the amplifier in normal working; and (3) using formulas:

$$Gain_{1j} = A_{1j} \times ASE_{1j} + B_{1j} \times ASE_{1j} + C_{1j} \times OUT + F_{1j}$$

$$Gain_{2j} = A_{2j} \times ASE_{2j} + B_{2j} \times ASE_{2j} + C_{2j} \times OUT + F_{2j}$$

to perform fitting on data $Gain_{ij}$ that is obtained when j increases by 1 each time and by using the foregoing steps, to obtain coefficients $A_1$, $A_2$, $B_1$, $B_2$, $C_1$, $C_2$, $F_1$, and $F_2$, where a least square method or another known mathematical method may be used as the fitting method.

Step 103: Compare the actual gain value of the amplifier with a preset gain value of the amplifier, and control the actual gain value of the amplifier and the preset gain value of the amplifier to be equal by using a gain-locking function.

The controlling the actual gain value of the amplifier and the preset gain value of the amplifier to be equal by using a gain-locking function mainly includes:

when the actual gain value of the amplifier is greater than the preset gain value of the amplifier, sending, to a pump source, an attenuation control signal to control the pump source to decrease power of pump light; or when the actual gain value of the amplifier is less than the preset gain value of the amplifier, sending, to a pump source, an amplification control signal to control the pump source to increase power of pump light.

When a fiber cut occurs, optical power of an input signal decreases quickly at a fiber-cut location. If the fiber-cut location is relatively far away from an amplifier, pump light consumption of input signal light in the remaining fiber reduces due to reduction of the input signal light, which causes an increase of remaining pump optical power in the fiber and an increase of an actual gain of the amplifier. A gain-locking function of the amplifier or a gain locking apparatus works quickly, which decreases pump power of pump light and maintains a gain of the amplifier unchanged basically. Because the gain of the amplifier is unchanged, output power of output signal light at an output end of the amplifier decreases quickly with the decrease, caused by the fiber cut, of the power of the input signal light. When the power of the output signal light decreases to power that is lower than preset power (less than or equal to minimum output power of the amplifier in normal working), it is determined that a fiber link failure occurs. If the fiber-cut location is relatively near an optical pump, an input optical signal cannot be amplified effectively by means of pump light due to a close distance between the fiber-cut location and the optical pump, power of an output optical signal decreases quickly due to the fiber cut, and when the power of the output optical signal is less than preset power, it is determined that a fiber link failure occurs. After it is determined that a fiber link failure occurs, a security protection program is started to turn off the pump light or decrease the pump optical power to a safe range. According to this embodiment of the present invention, the gain-locking function is used to prevent impact of an optical signal that is generated by the pump light due to spontaneous emission in the fiber, so that when a fiber cut occurs, output optical power of the amplifier is much lower than output optical power of the amplifier in normal working, thereby implementing link failure detection.

If a gain-locking function is unavailable, although power of an input optical signal decreases quickly in the case of a fiber cut, because pump optical power is unchanged, spontaneous emission light generated by pump light in a fiber includes light at a waveband of an input optical signal, and the spontaneous emission light that is generated by the pump light due to spontaneous emission and that is at the waveband of the input optical signal is amplified continuously, relatively high power of an output optical signal may still be detected at an output end of the fiber, where the optical power is close to or even higher than minimum output power of an amplifier in normal working. If a gain-locking function is available, with decrease of power of an input optical signal, a gain control apparatus controls pump optical power to decrease continuously. Accordingly, power of spontaneous emission light generated by pump light decreases continuously, and optical power of the spontaneous emission light at a waveband of the input optical signal also decreases continuously, which reduces impact brought by an optical signal that is generated due to spontaneous emission by the pump light in a fiber, so that when a fiber cut occurs, power of an output optical signal is much lower than minimum output power of an amplifier in normal working, thereby implementing link failure determining.

Step 104: Determine whether the power value of the output optical signal is less than a preset power value of the output optical signal. If yes, perform step 105; if not, go back to step 101.

Step 105: Determine that a fiber cut occurs.

When the power value of the output optical signal is less than the preset power value of the output optical signal, it indicates that a fiber cut occurs, and the fiber cut may be determined; or when the power value of the output optical signal is not less than the preset power value of the output optical signal, go back to step 101 to continue with the monitoring of the power value of the supervisory optical signal and the power value of the output optical signal.

It can be learned from the foregoing content that, the present invention has the following beneficial effects:

When a fiber cut occurs, optical power of an input signal decreases quickly at a fiber-cut location. If the fiber-cut location is relatively far away from an amplifier, pump light consumption of input signal light in the remaining fiber reduces due to reduction of the input signal light, which causes an increase of remaining pump optical power in the fiber and an increase of an actual gain of the amplifier. A gain-locking function of the amplifier or a gain locking apparatus works quickly, which decreases pump power of pump light and maintains a gain of the amplifier unchanged basically. Because the gain of the amplifier is unchanged, output power of output signal light at an output end of the amplifier decreases quickly with the decrease, caused by the fiber cut, of the power of the input signal light. When the power of the output signal light decreases to power that is lower than preset power (less than or equal to minimum output power of the amplifier in normal working), it is determined that a fiber link failure occurs. If the fiber-cut location is relatively near an optical pump, an input optical signal cannot be amplified effectively by means of pump light due to a close distance between the fiber-cut location and the optical pump, power of an output optical signal decreases quickly due to the fiber cut, and when the power of the output optical signal is less than preset power, it is determined that a fiber link failure occurs. After it is determined that a fiber link failure occurs, a security protection program is started to turn off the pump light or decrease the pump optical power to a safe range. According to this embodiment of the present invention, the gain-locking function is used to prevent impact of an optical signal that is generated by the pump light due to spontaneous emission in the fiber, so that when a fiber cut occurs, output optical power of the amplifier is much lower than output optical power of the amplifier in normal working, thereby implementing link failure detection.

Embodiment 2

Figure 2:
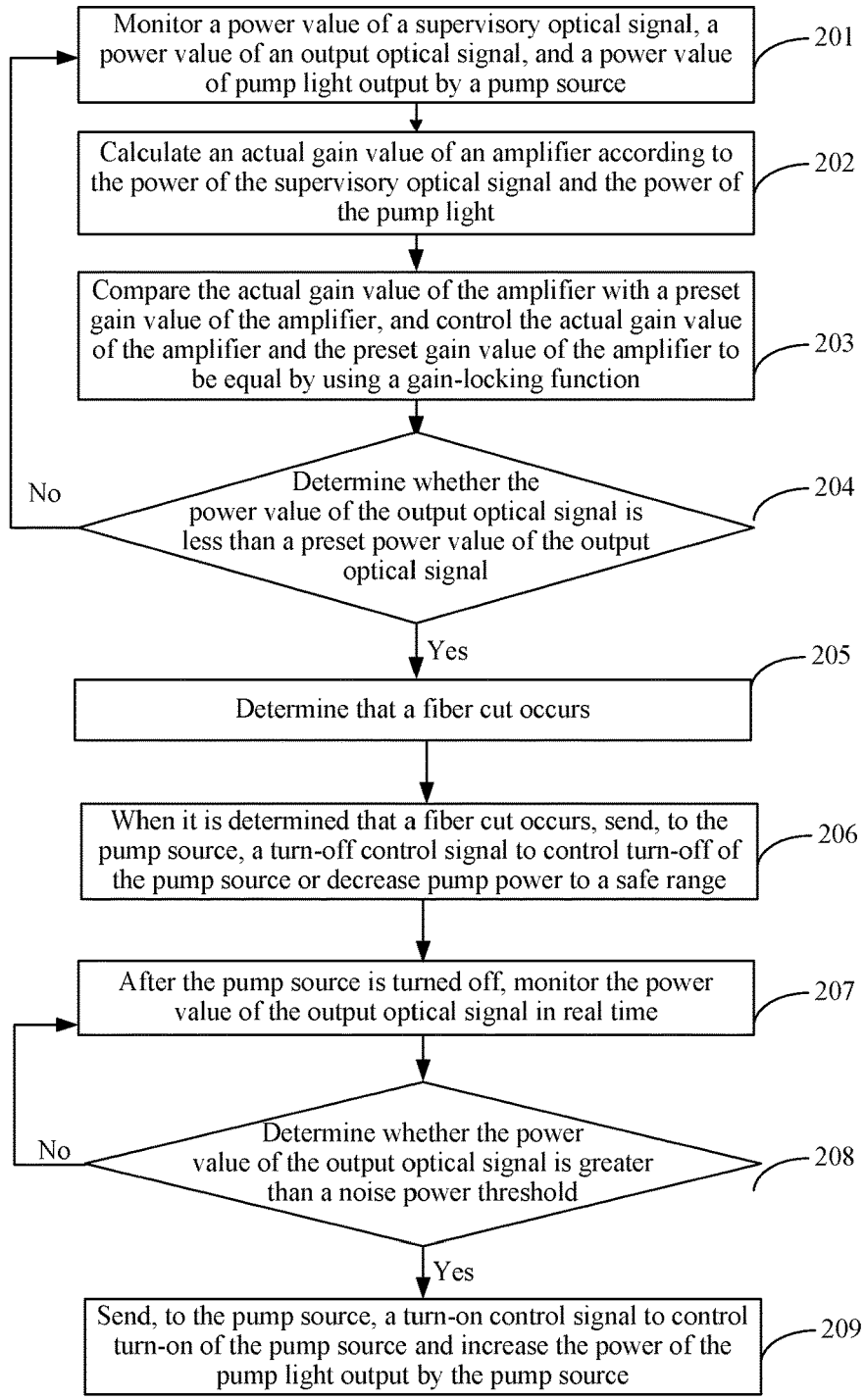
FIG. 2 is a flowchart of Embodiment 2 of a fiber-cut detection method for a distributed Raman fiber amplifier according to the present invention.

FIG. 2 is a flowchart of Embodiment 2 of a fiber-cut detection method for a distributed Raman fiber amplifier according to the present invention. Compared with Embodiment 1, Embodiment 2 further includes monitoring a power value of pump light. The method includes the following steps:

Step 201: Monitor a power value of a supervisory optical signal, a power value of an output optical signal, and a power value of pump light output by a pump source.

The supervisory optical signal is an optical signal at a long-wave end outside traffic optical signal bandwidth and/or an optical signal at a short-wave end outside traffic optical signal bandwidth that are/is obtained by filtering an input optical signal. A manner for monitoring the power value of the supervisory optical signal and the power value of the output optical signal is similar to that in Embodiment 1, which is not repeatedly described herein.

For monitoring the power value of the pump light output by the pump source, it is required to separately monitor a power value of pump light output by each optical pump because the pump source includes at least one optical pump. The power value of the pump light output by the pump source may be monitored directly, or the power value of the pump light output by the pump source may be monitored indirectly.

When the power value of the pump light output by the pump source is monitored indirectly, a preset proportion of optical signals of each pump light are received separately, and power of the preset proportion of optical signals is monitored to obtain the power value of each pump light indirectly. The preset proportion for each pump light may be the same or may be different, which is set according to an actual requirement.

Step 202: Calculate an actual gain value of an amplifier according to the power of the supervisory optical signal and the power of the pump light.

Using the power value of the pump light as a parameter for calculating the actual gain value may obtain a more precise actual gain value.

The actual gain value of the amplifier is calculated by using formula (7) and formula (8):

$$\text{Gain}_1 = A_1 \times \text{ASE}_1 + B_1 \times \text{ASE}_2 + D_1 \times \text{PUMP}_1 + E_1 \times \text{PUMP}_2 + F_1 \qquad (7)$$

$$\text{Gain}_2 = A_2 \times \text{ASE}_1 + B_2 \times \text{ASE}_2 + D_2 \times \text{PUMP}_1 + E_2 \times \text{PUMP}_2 + F_2 \qquad (8)$$

where $\text{Gain}_1$ is an actual gain value of an optical signal in a traffic optical signal at a short-wave end, $\text{ASE}_1$ is a power value of the optical signal at the short-wave end outside traffic optical signal bandwidth, $\text{PUMP}_1$ is a power value of pump light at the short-wave end outside traffic optical signal bandwidth, and $A_1$, $B_1$, $D_1$, $E_1$, and $F_1$ are system parameters for the short-wave end outside optical signal bandwidth; $\text{Gain}_2$ is an actual gain value of an optical signal in a traffic optical signal at a long-wave end, $\text{ASE}_2$ is a power value of the optical signal at the long-wave end outside traffic optical signal bandwidth, $\text{PUMP}_2$ is a power value of pump light at the long-wave end outside traffic optical signal bandwidth, and $A_2$, $B_2$, $D_2$, $E_2$, and $F_2$ are system parameters for a short-wave end outside optical signal bandwidth.

Coefficients $D_1$ and $D_2$ may be determined by using a least square fitting method in Embodiment 1.

In an actual application, formulas (9) and (10) may be used to calculate the actual gain value according to the power of the supervisory optical signal, the pump optical power, and the power of the output optical signal, so as to obtain a more precise actual gain value:

$$\text{Gain}_1 = A_1 \times \text{ASE}_1 + B_1 \times \text{ASE}_2 + C_1 \times \text{OUT} + D_1 \times \text{PUMP}_1 + E_1 \times \text{PUMP}_2 + F_1 \qquad (9)$$

$$\text{Gain}_2 = A_2 \times \text{ASE}_1 + B_2 \times \text{ASE}_2 + C_2 \times \text{OUT} + D_2 \times \text{PUMP}_1 + E_2 \times \text{PUMP}_2 + F_2 \qquad (10)$$

where $\text{Gain}_1$ is an actual gain value of an optical signal in a traffic optical signal at a short-wave end, $\text{ASE}_1$ is a power value of the optical signal at the short-wave end outside traffic optical signal bandwidth, OUT is the power value of the output optical signal, $\text{PUMP}_1$ is a power value of pump light at the short-wave end outside traffic optical signal bandwidth, and $A_1$, $B_1$, $C_1$, $D_1$, $E_1$, and $F_1$ are system parameters for the short-wave end outside optical signal bandwidth; $\text{Gain}_2$ is an actual gain value of an optical signal in a traffic optical signal at a long-wave end, $\text{ASE}_2$ is a power value of the optical signal at the long-wave end outside traffic optical signal bandwidth, $\text{PUMP}_2$ is a power value of pump light at the long-wave end outside traffic optical signal bandwidth, and $A_2$, $B_2$, $C_2$, $D_2$, $E_2$, and $F_2$ are system parameters for a short-wave end outside optical signal bandwidth.

Herein, it should be noted that values of system parameters $A_1$, $B_1$, $C_1$, $D_1$, $E_1$, and $F_1$, and $A_2$, $B_2$, $C_2$, $D_2$, $E_2$, and $F_2$ of the amplifier in the present invention are different in different amplifier systems, which are set according to an actual situation.

Coefficients $E_1$ and $E_2$ may be determined by using a least square fitting method in Embodiment 1.

Step 203: Compare the actual gain value of the amplifier with a preset gain value of the amplifier, and control the actual gain value of the amplifier and the preset gain value of the amplifier to be equal by using a gain-locking function.

Step 204: Determine whether the power value of the output optical signal is less than a preset power value of the output optical signal. If yes, perform step 205; if not, go back to step 201.

Step 205: Determine that a fiber cut occurs.

For step 203 and step 205, which are similar to Embodiment 1, refer to descriptions in Embodiment 1, and details are not repeatedly described herein.

Step 206: When it is determined that a fiber cut occurs, send, to a pump source, a turn-off control signal to control turn-off of the pump source or decrease pump power to a safe range.

When a fiber cut occurs, to prevent injury to the human body caused by leakage of a high-power pump optical signal at the fiber-cut location, it is required to control turn-off of the pump source or decrease the pump power to a safe range.

In an actual application, the method further includes the following steps:

Step 207: After the pump source is turned off, monitor the power value of the output optical signal in real time.

Step 208: Determine whether the power value of the output optical signal is greater than a noise power threshold. If yes, perform step 209; if not, go back to step 207.

Step 209: Send, to the pump source, a turn-on control signal to control turn-on of the pump source and increase the power of the pump light output by the pump source.

After the pump source is turned off, power of the output optical signal is monitored in real time. After the fiber cut is repaired and the communications link is reconnected, it is detected that the power of the output optical signal increases continuously. When the power of the output optical signal exceeds the noise threshold, it indicates that the detected output optical signal is not noise but an input optical signal. In this case, the pump source is controlled to be turned on, and the power of the pump light output by the pump source is increased, so that the actual gain value of the amplifier is equal to the preset gain value.

When the power of the detected output optical signal is less than the noise threshold, it indicates that the detected output optical signal is noise. Then, go back to step 207 to continue with the real-time monitoring. Herein, it should be noted that the preset noise threshold may be set according to an actual requirement, which is not specifically limited herein.

It can be learned from the foregoing content that, the present invention further has the following beneficial effects:

According to this embodiment of the present invention, it may further be that, when it is determined that a fiber cut occurs, automatic control is performed to turn off a pump source or decrease pump power to a safe range, which prevents injury to the human body caused by leakage, at a fiber-cut location, of high-power pump light output by the pump source. It may further be that, after the pump source is turned off, power of an output optical signal is monitored in real time, and when the power of the output optical signal is greater than a noise power threshold, it indicates that a communications link recovers. In this case, automatic control is performed to turn on the pump source and increase power of pump light, so that an actual gain value of an amplifier is equal to a preset gain value, thereby implementing automatic link recovery.

Embodiment 3

Figure 3:
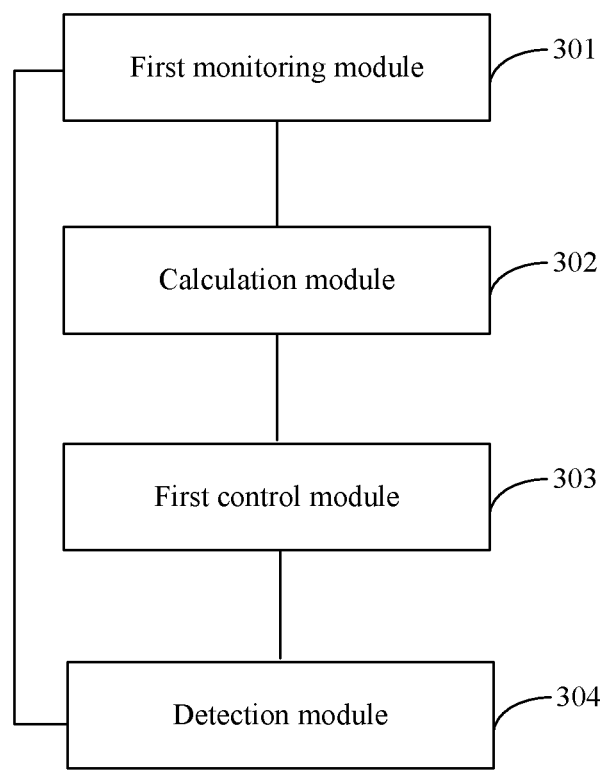
FIG. 3 is a schematic structural diagram of Embodiment 3 of a fiber-cut detection apparatus for a distributed Raman fiber amplifier according to the present invention.

FIG. 3 is a schematic structural diagram of Embodiment 3 of a fiber-cut detection apparatus for a distributed Raman fiber amplifier according to the present invention, where the apparatus is an apparatus corresponding to the method described in Embodiment 1 and includes:

a first monitoring module 301, configured to monitor a power value of a supervisory optical signal and a power value of an output optical signal, where the supervisory optical signal is an optical signal at a long-wave end outside traffic optical signal bandwidth and/or an optical signal at a short-wave end outside traffic optical signal bandwidth that are/is obtained by filtering an input optical signal;

a calculation module 302, configured to calculate an actual gain value of an amplifier according to the power value of the supervisory optical signal, where optionally, the calculation module 302 is:

a second calculation unit, configured to calculate the actual gain value of the amplifier according to the power value of the supervisory optical signal and the power value of the output optical signal;

a first control module 303, configured to: compare the actual gain value of the amplifier with a preset gain value of the amplifier, and control the actual gain value of the amplifier and the preset gain value of the amplifier to be equal by using a gain-locking function; and a detection module 304, configured to determine whether the power value of the output optical signal is less than a preset power value of the output optical signal, and if yes, determine that a fiber cut occurs, where when the power value of the output optical signal is not less than a preset power value of the output optical signal, no fiber cut occurs, and the first monitoring module 301 continues with the monitoring.

For the logical functions herein, which are similar to Embodiment 1, refer to descriptions in Embodiment 1, and details are not repeatedly described herein.

Embodiment 4

Figure 4:
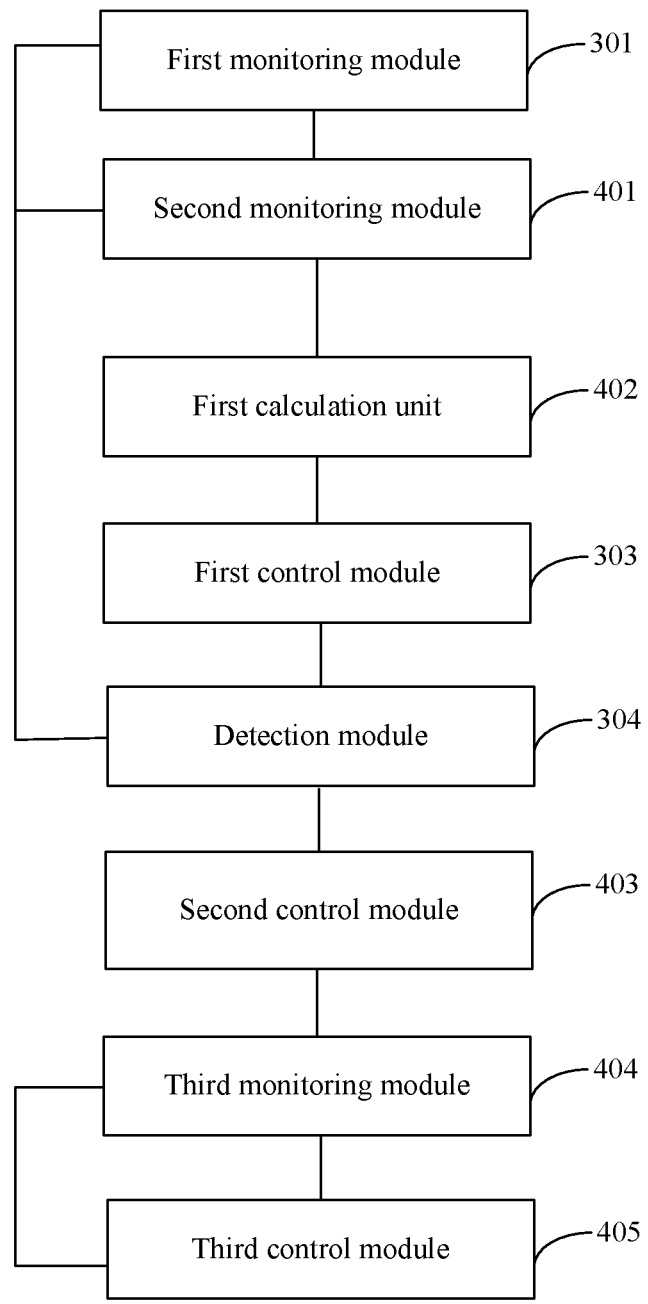
FIG. 4 is a schematic structural diagram of Embodiment 4 of a fiber-cut detection apparatus for a distributed Raman fiber amplifier according to the present invention.

FIG. 4 is a schematic structural diagram of Embodiment 4 of a fiber-cut detection apparatus for a distributed Raman fiber amplifier according to the present invention, where the apparatus is an apparatus corresponding to the method described in Embodiment 2 and includes:

a first monitoring module 301, configured to monitor a power value of a supervisory optical signal and a power value of an output optical signal, where the supervisory optical signal is an optical signal at a long-wave end outside traffic optical signal bandwidth and/or an optical signal at a short-wave end outside traffic optical signal bandwidth that are/is obtained by filtering an input optical signal;

a second monitoring module 401, configured to monitor a power value of pump light output by a pump source; where the first monitoring module 301 and the second monitoring module 401 may be a same monitoring module, or may be different monitoring modules;

a first calculation unit 402, configured to calculate an actual gain value of an amplifier according to the power value of the supervisory optical signal and the power value of the pump light;

a first control module 303, configured to: compare the actual gain value of the amplifier with a preset gain value of the amplifier, and control the actual gain value of the amplifier and the preset gain value of the amplifier to be equal by using a gain-locking function, and optionally, the first control module 303 includes:

a first control unit, configured to: when the actual gain value of the amplifier is greater than the preset gain value of the amplifier, send, to the pump source, an attenuation control signal to control the pump source to decrease the power of the pump light; and a second control unit, configured to: when the actual gain value of the amplifier is less than the preset gain value of the amplifier, send, to the pump source, an amplification control signal to control the pump source to increase the power of the pump light;

a detection module 304, configured to determine whether the power value of the output optical signal is less than a preset power value of the output optical signal, and if yes, determine that a fiber cut occurs; and a second control module 403, configured to: when it is determined that a fiber cut occurs, send, to the pump source, a turn-off control signal to control turn-off of the pump source or decrease pump power to a safe range.

In actual use, the apparatus further includes:

a third monitoring module 404, configured to: after the pump source is turned off, monitor the power value of the output optical signal in real time; and a third control module 405, configured to determine whether the power value of the output optical signal is greater than a noise power threshold, and if yes, send a turn-on control signal to the pump source, where when the power of the output optical signal is not greater than the noise power threshold, the third monitoring module 404 continues with the monitoring.

For the logical functions herein, which are similar to Embodiment 2, refer to descriptions in Embodiment 2, and details are not repeatedly described herein.

Embodiment 5

Figure 5:
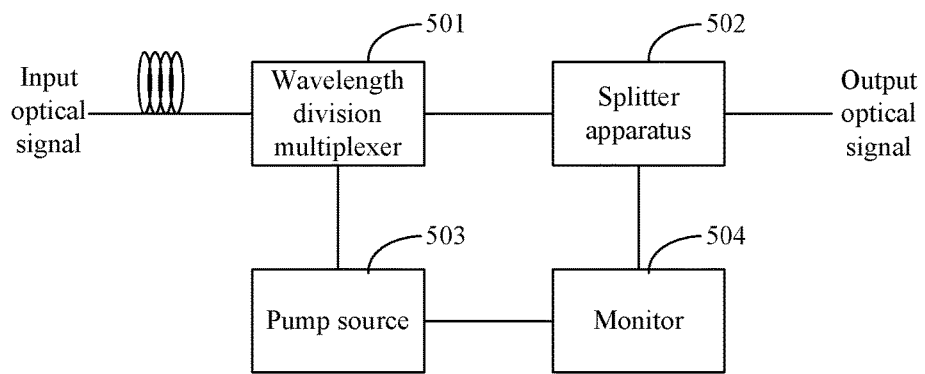
FIG. 5 is a schematic structural diagram of Embodiment 5 of a fiber-cut detection system for a distributed Raman fiber amplifier according to the present invention.

FIG. 5 is a schematic structural diagram of Embodiment 5 of a fiber-cut detection system for a distributed Raman fiber amplifier according to the present invention, where the system includes:

a wavelength division multiplexer 501, a splitter apparatus 502, a pump source 503, and a monitor 504.

The wavelength division multiplexer 501 receives at least one channel of pump light output by the pump source 503, and injects the received pump light backwards into a communications optical fiber; and the wavelength division multiplexer 501 further receives an input optical signal and transmits the input optical signal to the splitter apparatus 502.

The splitter apparatus 502 obtains a supervisory optical signal by filtering the input optical signal, and uses a first preset proportion of light, split from an output optical signal, as an output detection optical signal, where the supervisory optical signal is an optical signal at a long-wave end outside traffic optical signal bandwidth and/or an optical signal at a short-wave end outside traffic optical signal bandwidth that are/is obtained by filtering the input optical signal.

The splitter apparatus 502 has four possible structures.

Figure 6:
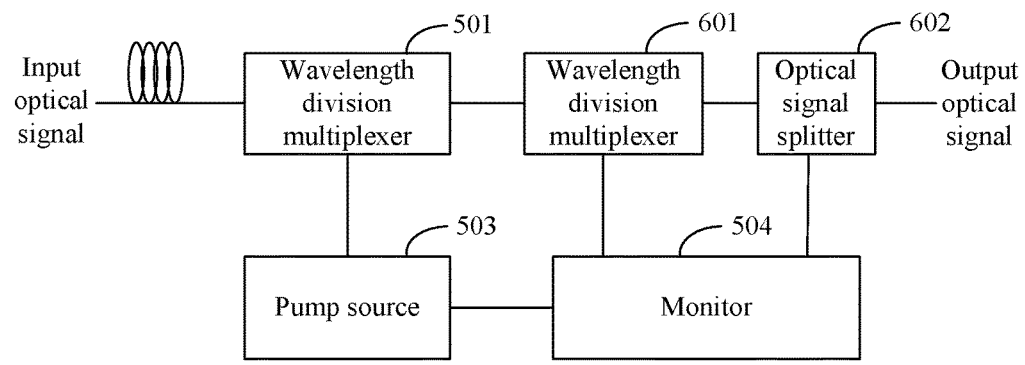
FIG. 6 is a first possible schematic structural diagram of a splitter apparatus according to the present invention.

A first possible structure is shown in FIG. 6, where the splitter apparatus 502 includes:

one wavelength division multiplexer 601 and one optical signal splitter 602 connected in sequence.

The wavelength division multiplexer 601 obtains, by filtering the input optical signal, the optical signal at the long-wave end outside traffic optical signal bandwidth or the optical signal at the short-wave end outside traffic optical signal bandwidth.

The wavelength division multiplexer 601 transmits, to the monitor 504, the optical signal at the long-wave end outside traffic optical signal bandwidth or the optical signal at the short-wave end outside traffic optical signal bandwidth that is obtained by means of filtering, so that the monitor 504 monitors a power value of the optical signal at the short-wave end outside traffic optical signal bandwidth or the optical signal at the long-wave end outside traffic optical signal bandwidth, to calculate an actual gain value of an amplifier.

The optical signal splitter 602 uses the first preset proportion of light, split from the output optical signal, as the output detection optical signal.

Herein, it should be noted that the first preset proportion may be set according to an actual requirement, and that the power of the output optical signal may be obtained according to the first preset proportion by monitoring power of the detection optical signal. In general cases, the first preset proportion does not exceed 10%, so as to avoid impact brought by an output signal to data transmission.

Figure 7:
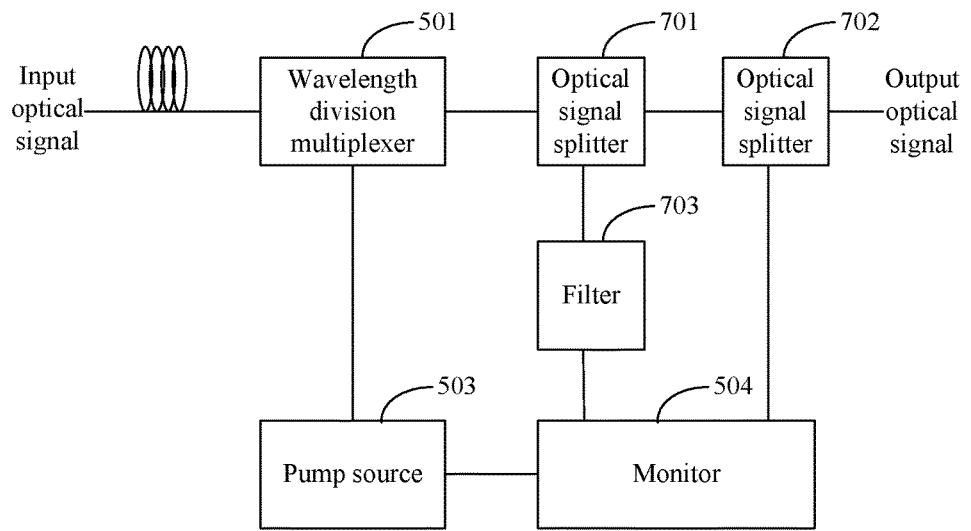
FIG. 7 is a second possible schematic structural diagram of a splitter apparatus according to the present invention.

A second possible structure is shown in FIG. 7, where the splitter apparatus 502 includes:

two optical signal splitters 701 and 702, and one filter 703.

One optical signal splitter 701 uses a second preset proportion of light, split from the output optical signal, as a filtering optical signal, and the filter 703 filters the filtering optical signal to obtain the optical signal at the long-wave end outside traffic optical signal bandwidth or the optical signal at the short-wave end outside traffic optical signal bandwidth.

The optical signal splitter 701 obtains, by splitting the output optical signal according to the second preset proportion, the filtering optical signal, where the second preset proportion may be specifically set according to an actual requirement, not exceeding 10% in general cases; the filter obtains, by filtering the filtering optical signal, the optical signal at the long-wave end outside traffic optical signal bandwidth or the optical signal at the short-wave end outside traffic optical signal bandwidth; and the monitor 504 may then detect the power value of the optical signal at the long-wave end outside traffic optical signal bandwidth or the optical signal at the short-wave end outside traffic optical signal bandwidth of the output optical signal according to the second preset proportion.

The other optical signal splitter 702 uses the first preset proportion of light, split from the output optical signal, as the output detection optical signal.

Figure 8:
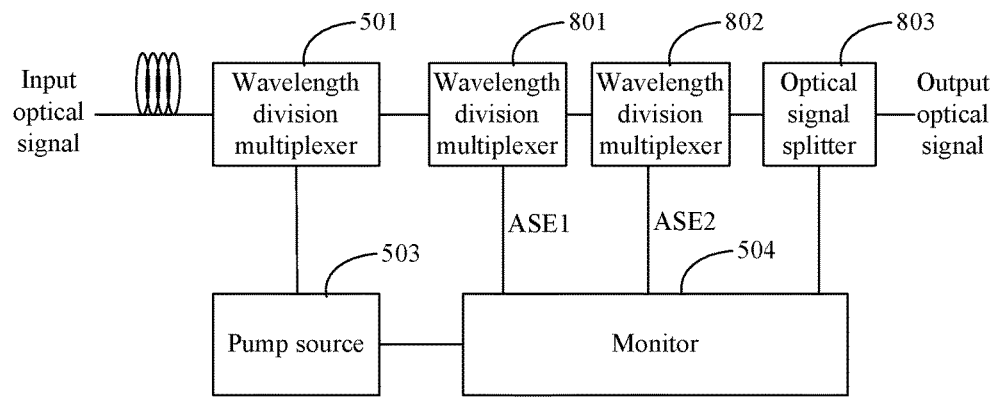
FIG. 8 is a third possible schematic structural diagram of a splitter apparatus according to the present invention.

A third possible structure is shown in FIG. 8, where the splitter apparatus 502 includes:

two wavelength division multiplexers and one optical signal splitter connected in sequence.

The two wavelength division multiplexers respectively obtain, by filtering the output optical signal, the optical signal at the long-wave end outside traffic optical signal bandwidth and the optical signal at the short-wave end outside traffic optical signal bandwidth.

A wavelength division multiplexer 801, a wavelength division multiplexer 802, and an optical signal splitter 803 are connected in sequence.

The wavelength division multiplexer 801 obtains, by filtering the output optical signal, the optical signal at the short-wave end outside traffic optical signal bandwidth, and the wavelength division multiplexer 802, by filtering the output optical signal, the optical signal ASE2 at the long-wave end outside traffic optical signal bandwidth. The wavelength division multiplexer 801 and the wavelength division multiplexer 802 output, to the monitor 504, the optical signal at the long-wave end outside traffic optical signal bandwidth and the optical signal at the short-wave end outside traffic optical signal bandwidth that are obtained by means of filtering, so that the monitor obtains by means of calculation the actual gain value of the amplifier according to the optical signal at the long-wave end outside traffic optical signal bandwidth and the optical signal at the short-wave end outside traffic optical signal bandwidth. The actual gain value obtained by means of calculation by using the foregoing method is more precise than that obtained by means of calculation according to either of the optical signal at the long-wave end outside traffic optical signal bandwidth and the optical signal at the short-wave end outside traffic optical signal bandwidth.

The optical signal splitter 803 uses the first preset proportion of light, split from the output optical signal, as the output detection optical signal.

Figure 9:
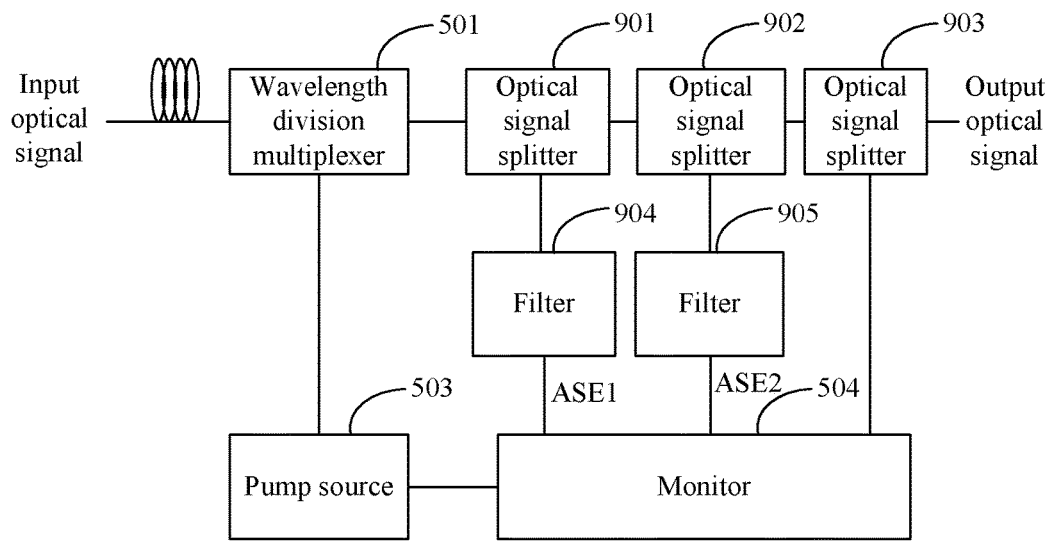
FIG. 9 is a fourth possible schematic structural diagram of a splitter apparatus according to the present invention.

A fourth possible structure is shown in FIG. 9, where the splitter apparatus 502 includes:

three optical signal splitters 901, 902, and 903, and two filters 904 and 905.

The first optical signal splitter 901 uses a second preset proportion of light, split from the output optical signal, as a first filtering optical signal, and the first filter 904 filters the first filtering optical signal to obtain the optical signal at the short-wave end outside traffic optical signal bandwidth.

The second optical signal splitter 902 uses a third preset proportion of light, split from the output optical signal, as a second filtering optical signal, and the second filter 905 filters the second filtering optical signal to obtain the optical signal at the long-wave end outside traffic optical signal bandwidth.

The third optical signal splitter 903 uses the first preset proportion of light, split from the output optical signal, as the output detection optical signal.

The second preset proportion and the second preset proportion may be specifically set according to an actual requirement, and the second preset proportion and the third preset proportion may be the same or may be different.

The monitor monitors a power value of the supervisory optical signal, monitors a power value of the output optical signal by using the output detection optical signal, and calculates an actual gain value of an amplifier according to the power value of the supervisory optical signal; the monitor compares the actual gain value of the amplifier with a preset gain value of the amplifier, and controls the actual gain value of the amplifier and the preset gain value of the amplifier to be equal by using a gain-locking function; and the monitor determines whether the power value of the output optical signal is less than a preset power value of the output optical signal, and if yes, determines that a fiber cut occurs.

Optionally, the monitor may further calculate the actual gain value of the amplifier according to the power value of the supervisory optical signal and the power value of the output optical signal.

Optionally, the monitor may be further configured to: after a pump source is turned off, monitor the power value of the output optical signal in real time; and determine whether the power value of the output optical signal is greater than a noise power threshold, and if yes, send a turn-on control signal to the pump source.

Optionally, the system further includes:

a pump light splitting apparatus, where the pump light splitting apparatus includes at least one optical signal splitter, and a quantity of the optical signal splitters is the same as a quantity of optical pumps in the pump source.

Each optical signal splitter in the pump light splitting apparatus uses a fourth preset proportion of light, split from pump light that is output by one optical pump in a pump source connected to the optical signal splitter, as a pump detection optical signal, and transmits the pump detection optical signal to the monitor.

Figure 10:
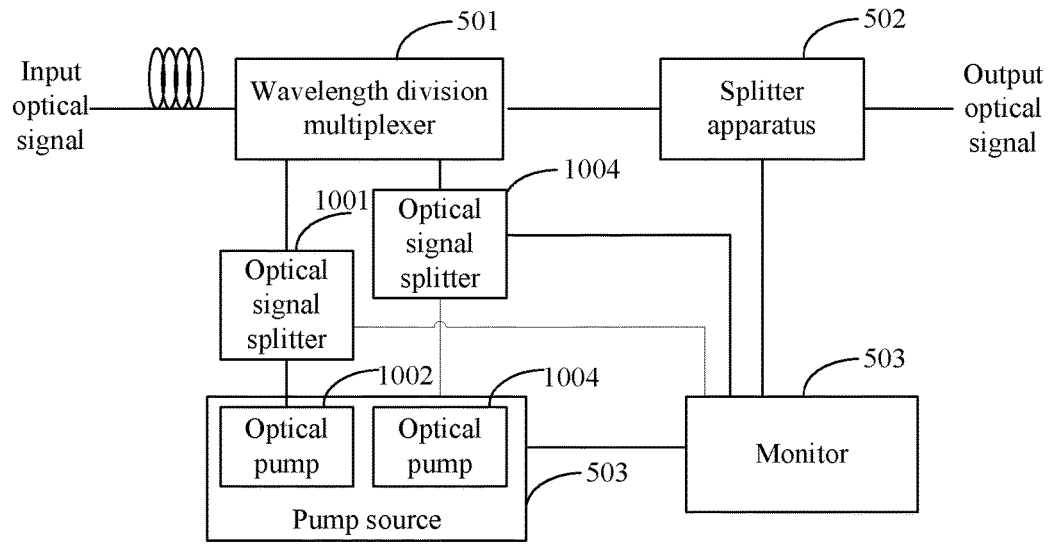
FIG. 10 is a schematic structural diagram of a fiber-cut detection system for a distributed Raman fiber amplifier, including a pump light splitting apparatus, according to the present invention.

As shown in FIG. 10, the pump light splitting apparatus includes an optical signal splitter 1001 and an optical signal splitter 1003. The optical signal splitter 1001 obtains a first pump detection optical signal by splitting, according to the fourth preset proportion, pump light that is output by an optical pump 1002; the optical signal splitter 1002 obtains a second pump detection optical signal by splitting, according to the fourth preset proportion, pump light that is output by an optical pump 1004. Herein, it should be noted that quantities of optical signal splitters and optical pumps may be both only one, or may be both three or more, which are not merely limited to only two shown in FIG. 10, and may be specifically set according to an actual situation.

The monitor monitors, according to the pump detection optical signal sent by each optical signal splitter in the pump light splitting apparatus, a power value of the pump light of the optical pump that is connected to the optical signal splitter, and calculates the actual gain value of the amplifier according to the power value of the supervisory optical signal and the power value of the pump light.

Using power of pump light of all optical pumps in the pump source as a parameter for calculating the actual gain value may improve accuracy of calculating the actual gain value.

In actual use, the monitor is further configured to calculate the actual gain value of the amplifier according to the power value of the supervisory optical signal, the power value of the pump light, and the power value of the output optical signal, so as to further improve calculation precision of the actual gain value of the amplifier.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A fiber-cut detection system for a distributed Raman fiber amplifier, wherein the system comprises:

a wavelength division multiplexer;

a splitter apparatus;

a pump source; and a monitor, wherein:

the wavelength division multiplexer receives at least one channel of pump light output by the pump source and injects the received pump light backwards into a communications optical fiber, and the wavelength division multiplexer further receives an input optical signal and transmits the input optical signal to the splitter apparatus;

the splitter apparatus obtains a supervisory optical signal by filtering the input optical signal, and uses a first preset proportion of light, split from an output optical signal, as an output detection optical signal, wherein the supervisory optical signal is an optical signal at a long-wave end outside traffic optical signal bandwidth and an optical signal at a short-wave end outside traffic optical signal bandwidth that are obtained by filtering the input optical signal or wherein the supervisory optical signal is the optical signal at the long-wave end outside traffic optical signal bandwidth that is obtained by filtering the input optical signal; and the monitor monitors a power value of the supervisory optical signal, monitors a power value of the output optical signal by using the output detection optical signal, calculates an actual gain value of an amplifier according to the power value of the supervisory optical signal, compares the actual gain value of the amplifier with a preset gain value of the amplifier, controls the actual gain value of the amplifier and the preset gain value of the amplifier to be equal by using a gain-locking function, determines whether the power value of the output optical signal is less than a preset power value of the output optical signal, and determines that a fiber cut occurs when the power value of the output optical signal is less than the preset power value of the output optical signal, wherein:

the splitter apparatus comprises two wavelength division multiplexers and one optical signal splitter connected in sequence;

the two wavelength division multiplexers respectively obtain, by filtering the output optical signal, the optical signal at the long-wave end outside traffic optical signal bandwidth and the optical signal at the short-wave end outside traffic optical signal bandwidth; and the optical signal splitter uses the first preset proportion of light, split from the output optical signal, as the output detection optical signal.

2. The system according to claim 1, wherein:
the system further comprises a pump light splitting apparatus;
the pump light splitting apparatus comprises at least one optical signal splitter, and a quantity of the optical signal splitters is the same as a quantity of optical pumps in the pump source;
each optical signal splitter in the pump light splitting apparatus uses a second preset proportion of light, split from pump light that is output by one optical pump in the pump source connected to the optical signal splitter, as a pump detection optical signal, and transmits the pump detection optical signal to the monitor; and
the monitor monitors, according to the pump detection optical signal sent by each optical signal splitter in the pump light splitting apparatus, a power value of the pump light of the optical pump that is connected to the optical signal splitter, and calculates the actual gain value of the amplifier according to the power value of the supervisory optical signal and the power value of the pump light.

3. The system according to claim 1, wherein the monitor is further configured to calculate the actual gain value of the amplifier according to the power value of the supervisory optical signal and the power value of the output optical signal.

4. The system according to claim 1, wherein the monitor is further configured to calculate the actual gain value of the amplifier according to the power value of the supervisory optical signal, the power value of the pump light, and the power value of the output optical signal.

5. The system according to claim 1, wherein the monitor is further configured to:
when the actual gain value of the amplifier is greater than the preset gain value of the amplifier, send, to the pump source, an attenuation control signal to control the pump source to decrease the power of the pump light; or
when the actual gain value of the amplifier is less than the preset gain value of the amplifier, send, to the pump source, an amplification control signal to control the pump source to increase the power of the pump light.

6. A fiber-cut detection system for a distributed Raman fiber amplifier, wherein the system comprises:
a wavelength division multiplexer;
a splitter apparatus;
a pump source; and
a monitor, wherein:
the wavelength division multiplexer receives at least one channel of pump light output by the pump source and injects the received pump light backwards into a communications optical fiber, and the wavelength division multiplexer further receives an input optical signal and transmits the input optical signal to the splitter apparatus;
the splitter apparatus obtains a supervisory optical signal by filtering the input optical signal, and uses a first preset proportion of light, split from an output optical signal, as an output detection optical signal, wherein the supervisory optical signal is an optical signal at a long-wave end outside traffic optical signal bandwidth and an optical signal at a short-wave end outside traffic optical signal bandwidth that are obtained by filtering the input optical signal or wherein the supervisory optical signal is the optical signal at the long-wave end outside traffic optical signal bandwidth that is obtained by filtering the input optical signal; and
the monitor monitors a power value of the supervisory optical signal, monitors a power value of the output optical signal by using the output detection optical signal, calculates an actual gain value of an amplifier according to the power value of the supervisory optical signal, compares the actual gain value of the amplifier with a preset gain value of the amplifier, controls the actual gain value of the amplifier and the preset gain value of the amplifier to be equal by using a gain-locking function, determines whether the power value of the output optical signal is less than a preset power value of the output optical signal, and determines that a fiber cut occurs when the power value of the output optical signal is less than the preset power value of the output optical signal, wherein:
the splitter apparatus comprises three optical signal splitters and two filters;
a first optical signal splitter uses a second preset proportion of light, split from the output optical signal, as a first filtering optical signal, and a first filter filters the first filtering optical signal to obtain the optical signal at the short-wave end outside traffic optical signal bandwidth;
a second optical signal splitter uses a third preset proportion of light, split from the output optical signal, as a second filtering optical signal, and a second filter filters the second filtering optical signal to obtain the optical signal at the long-wave end outside traffic optical signal bandwidth; and a third optical signal splitter uses the first preset proportion of light, split from the output optical signal, as the output detection optical signal.

7. The system according to claim 6, wherein:

the system further comprises a pump light splitting apparatus;

the pump light splitting apparatus comprises at least one optical signal splitter, and a quantity of the optical signal splitters is the same as a quantity of optical pumps in the pump source;

each optical signal splitter in the pump light splitting apparatus uses a fourth preset proportion of light, split from pump light that is output by one optical pump in the pump source connected to the optical signal splitter, as a pump detection optical signal, and transmits the pump detection optical signal to the monitor; and the monitor monitors, according to the pump detection optical signal sent by each optical signal splitter in the pump light splitting apparatus, a power value of the pump light of the optical pump that is connected to the optical signal splitter, and calculates the actual gain value of the amplifier according to the power value of the supervisory optical signal and the power value of the pump light.

8. The system according to claim 6, wherein the monitor is further configured to calculate the actual gain value of the amplifier according to the power value of the supervisory optical signal and the power value of the output optical signal.

9. The system according to claim 6, wherein the monitor is further configured to calculate the actual gain value of the amplifier according to the power value of the supervisory optical signal, the power value of the pump light, and the power value of the output optical signal.

10. The system according to claim 6, wherein the monitor is further configured to:

when the actual gain value of the amplifier is greater than the preset gain value of the amplifier, send, to the pump source, an attenuation control signal to control the pump source to decrease the power of the pump light; or when the actual gain value of the amplifier is less than the preset gain value of the amplifier, send, to the pump source, an amplification control signal to control the pump source to increase the power of the pump light.

* * * * *